UNITED STATES PATENT OFFICE.

WILLIAM A. RUTH, OF WYOMING, DELAWARE, ASSIGNOR TO JOHN T. JAKES, WILLIAM BROADAWAY, AND W. A. RUTH, OF SAME PLACE.

IMPROVEMENT IN MEDICAL COMPOUNDS FOR KIDNEY DISEASES.

Specification forming part of Letters Patent No. 137,488, dated April 1, 1873; application filed September 28, 1872.

*To all whom it may concern:*

Be it known that I, WILLIAM A. RUTH, of Wyoming, in the county of Kent and State of Delaware, have invented an Improved Medical Compound for Dyspepsia and Diseases of the Kidneys, of which the following is a specification:

This compound is made up of the following ingredients in the specified proportions: Sarsaparilla root, marsh-mallow, and gin.

Take thirty grains of each of the above-named articles, put them together and steep them in a sufficient quantity of water to extract their strength. Then strain the decoction and add to it, for a preservative, a half-ounce of gin to every sixty grains of the sarsaparilla and marsh-mallow.

I claim as my invention—

The compound of sarsaparilla, marsh-mallow, and gin, as specified.

WILLIAM A. RUTH.

Witnesses:
ELIAS S. REED,
WM. G. HAWKINS.